United States Patent [19]

Meisinger et al.

[11] Patent Number: 5,009,126
[45] Date of Patent: Apr. 23, 1991

[54] HYDROSTATIC-MECHANICAL DRIVE SYSTEM

[75] Inventors: Erwin Meisinger, Hauzenberg; Jürgen Zimmer, Passau, both of Fed. Rep. of Germany

[73] Assignee: Zahnfabrik Friedrichshafen AG, Friedrichshafen, Fed. Rep. of Germany

[21] Appl. No.: 469,572

[22] PCT Filed: Oct. 5, 1988

[86] PCT No.: PCT/EP88/00889
§ 371 Date: Apr. 5, 1990
§ 102(e) Date: Apr. 5, 1990

[87] PCT Pub. No.: WO89/03320
PCT Pub. Date: Apr. 20, 1989

[30] Foreign Application Priority Data

Oct. 13, 1987 [DE] Fed. Rep. of Germany ....... 3734622

[51] Int. Cl.⁵ .......................................... F16H 47/06
[52] U.S. Cl. ................................. 74/733.1; 192/4 R
[58] Field of Search ............... 74/730.1, 731.1, 732.1, 74/733.1; 192/4 R

[56] References Cited

U.S. PATENT DOCUMENTS

| | | | |
|---|---|---|---|
| 2,741,351 | 4/1956 | Fletcher et al. | 192/4 R |
| 3,864,991 | 2/1975 | Nembach | 74/733.1 |
| 4,187,739 | 2/1980 | Hamma et al. | 74/733.1 |
| 4,192,199 | 3/1980 | Hamma et al. | 74/733.1 X |
| 4,528,871 | 7/1985 | Nembach | 74/733.1 |
| 4,899,542 | 2/1990 | Iino | 74/733.1 X |
| 4,939,954 | 7/1990 | Walzer et al. | 74/733.1 |

FOREIGN PATENT DOCUMENTS

| | | |
|---|---|---|
| 1294233 | 4/1969 | Fed. Rep. of Germany . |
| 3149473 | 7/1982 | Fed. Rep. of Germany . |
| 3425757 | 1/1986 | Fed. Rep. of Germany . |
| 2442740 | 6/1980 | France . |

*Primary Examiner*—Dwight Diehl
*Attorney, Agent, or Firm*—Herbert Dubno

[57] ABSTRACT

Hydrostatic-mechanical gearbox for agricultural and construction vehicles with adjustable reducing gear ratio and a spring-loaded disk brake (19) incorporated in the mechanical gearbox (9) and which acts directly upon the driven shaft (11) of the mechanical gearbox (9) and is actuated depending on the operational condition of the hydrostatic gearbox.

3 Claims, 3 Drawing Sheets

HYDROSTATIC-MECHANICAL DRIVE SYSTEM

FIELD OF THE INVENTION

The invention relates to a hydrostatic-mechanical drive system and a method for the operation thereof.

THE RELATED ART

Comfortable driving and operational safety of modern vehicles carrying agricultural and construction machines require that the vehicle be drivable in various speed ranges according to traffic, that it can be safely parked, and that it can be ready to perform these functions with a high degree of reliability. The transmission and the brake components of agricultural and construction vehicles are highly exposed to the dangers of dirt and damage. The complex functions which have to be performed by modern agricultural and construction vehicles require the operation of a great number of regulating units and increase the possibility of human error during the operation of these vehicles.

It is known (DE-OS No. 34 25 757) to have a hydrostatic-mechanical drive system equipped with an adjustable reducing gear ratio, so that the regulating elements shift the adjustable hydrostatic gearbox automatically, depending on changes in the reducing ratio of a mechanical gearbox.

Further, from DE-A-No. 31 49 473 a hydrostatic drive system has become known, which has a hydraulic motor with variable delivery and wherein a spring-loaded parking brake triggered by the pressure medium from the high-pressure segment is mounted on the driven shaft of the hydraulic motor. If the pressure of the pressure medium surpasses a certain value, the hydraulic motor is reset in a position for increased delivery, whereby for the braking of the vehicle a high braking force is supposed to be produced.

SUMMARY OF THE INVENTION

It is the object of the present invention to create an operationally safe combination of a hydrostatic-mechanical multirange drive system with a mechanical parking brake and to make the control of the hydrostatic-mechanical multirange drive and of the parking brake especially user-friendly.

According to the invention, this objective is achieved by incorporating a mechanical parking brake into a mechanical two-step gearbox, the parking brake acting directly upon the driven shaft of the mechanical two-step gearbox, and by the fact that for the actuation of the parking brake pressure medium is branched off from the high-pressure segment of the hydrostatic cycle via a pressure duct and that a 3/2-way valve is switched which actuates a cylinder of the parking brake with the pressure of a servo hydraulic pump of the hydrostatic gearbox or connects it to a pressure-free return duct.

Since the parking brake acts directly upon the driven shaft of the two-step mechanical gearbox, when the brake is engaged the vehicle is prevented from unintentionally rolling away, independently of the fact that one speed is engaged. Because the parking brake is incorporated in the mechanical gearbox housing, it is possible to achieve a particularly compact construction of the gearbox and the parking brake, affording considerably improved safety for the parking brake against damage or dirt.

Since the actuation of the parking brake depends on the operational condition of the hydrostatic gearbox, a particularly safe operation of the parking brake is insured and for the driver the operation of the vehicle is simplified by one regulated quantity.

According to the invention, the arrangement of the mechanical gearbox with parking brake and hydrostatic drive and the actuation of the regulating unit for the adjustable hydromotor and the shifting of the mechanical two-step gearbox with the same hydraulic pressure medium used for the actuation of the parking brake lead to a particularly operationally safe drive system and method for controlling such a drive system.

BRIEF DESCRIPTION OF THE DRAWING

In the FIGS. 1 to 3, embodiment examples of the invention are represented.

DETAILED DESCRIPTION

Figure 1:
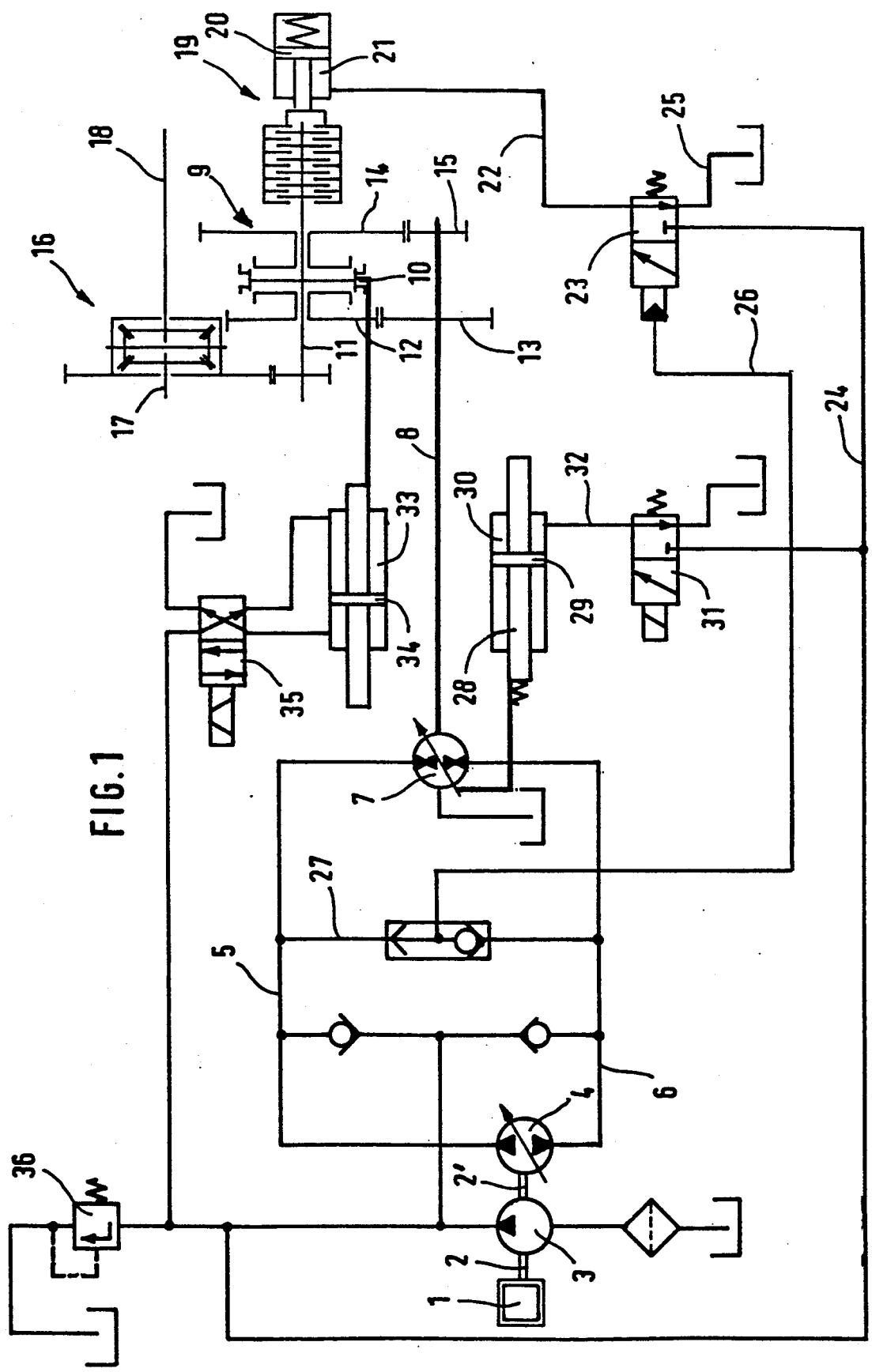

FIG. 1 is a general view of a drive system of a vehicle. It comprises a drive engine 1, which via a drive shaft 2 drives a servo hydraulic pump 3 for the production of servo pressure and via a shaft extension 2' drives a hydraulic pump 4 with adjustable delivery. The hydraulic pump 4 is connected via working ducts 5 and 6 to a hydraulic motor 7 with adjustable throughput. Over a drive shaft 8, the hydraulic motor 7 is connected with a mechanical two-step gearbox 9. Depending on a shift ring operated in the known manner, the rotational speed of the driven shaft 11 is determined by the reducing ratio of two pairs of spur gears 12/13 or 14/25.

The driven shaft 11 drives two half axles 17, 18 via a differential 16. In the gearbox 9, a spring-loaded disk brake 19 is mounted on the driven shaft 11. A spring-loaded piston 20 in a cylinder 21 is connected with the disk brake 19.

In the cylinder 21 ends a duct 22, which is connected to the servopump 3 or a pressure-free return pass 25 via a 3/2 way valve 23 controlled by high pressure and a duct 24. The control of the high-pressure 3/2 way valve 23 is connected via pressure ducts 26, 27 to the working ducts 5, 6.

A two-position setting mechanism 28 with a piston 29 in a cylinder 30 regulates the hydraulic motor 7. The cylinder 30 is connected to servopressure or to the pressure-free return pass via 3/2-way valve 31 and the duct 32. The actuation of the 3/2-way valve 31 takes place in the usual manner, by electromagnet or pressure.

The mechanical two-step gearbox is hydraulically shifted. In a cylinder 33, a piston 34 is alternately actuated at one or the other of its ends with servopressure. A 4/3-way valve 35 connects one side of the piston with the servopressure and the other side of the piston with the pressure-free return pass, depending on the position of the piston. A pressure-relief valve 36 protects the servopressure duct system against excessive loads.

Figure 2:
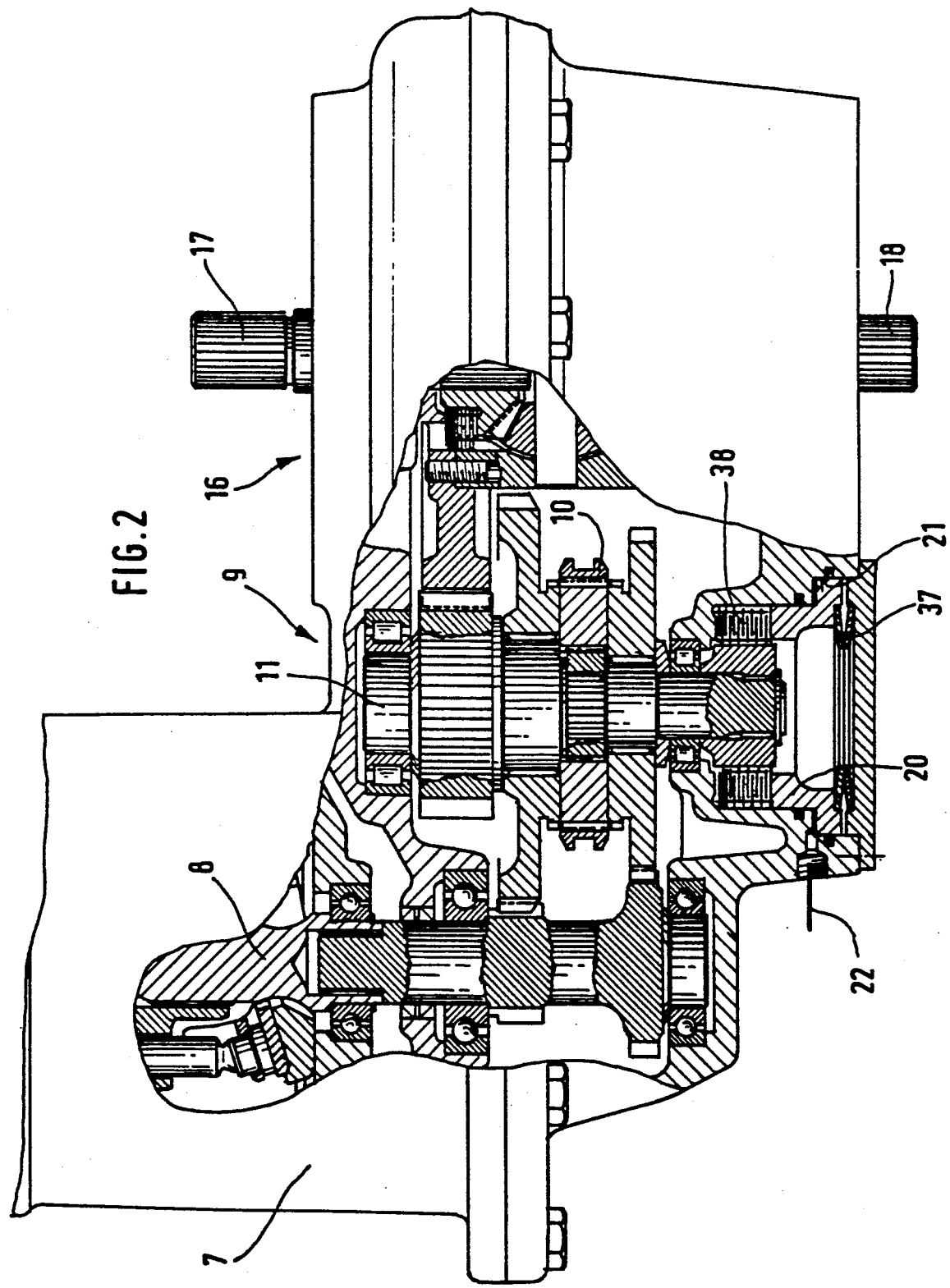

FIG. 2: The hydromotor 7 is flanged in the known manner to the mechanical two-step gearbox 9. The drive shaft 8 of the hydromotor 7 drives the driven shaft 11 depending on the position of the shift ring 10, and thereby also the half axles 17 and 18 with variable rotational speed. On the driven shaft 11, the disk brake 19 is mounted. The piston 20 and the cylinder 21 are connected via duct 22 with the 3/2-way valve 23, actuated by high pressure. A prestressed spring 37 also acts upon the piston 20, pressing it against the disks 38 of the disk brake 19.

Figure 3:
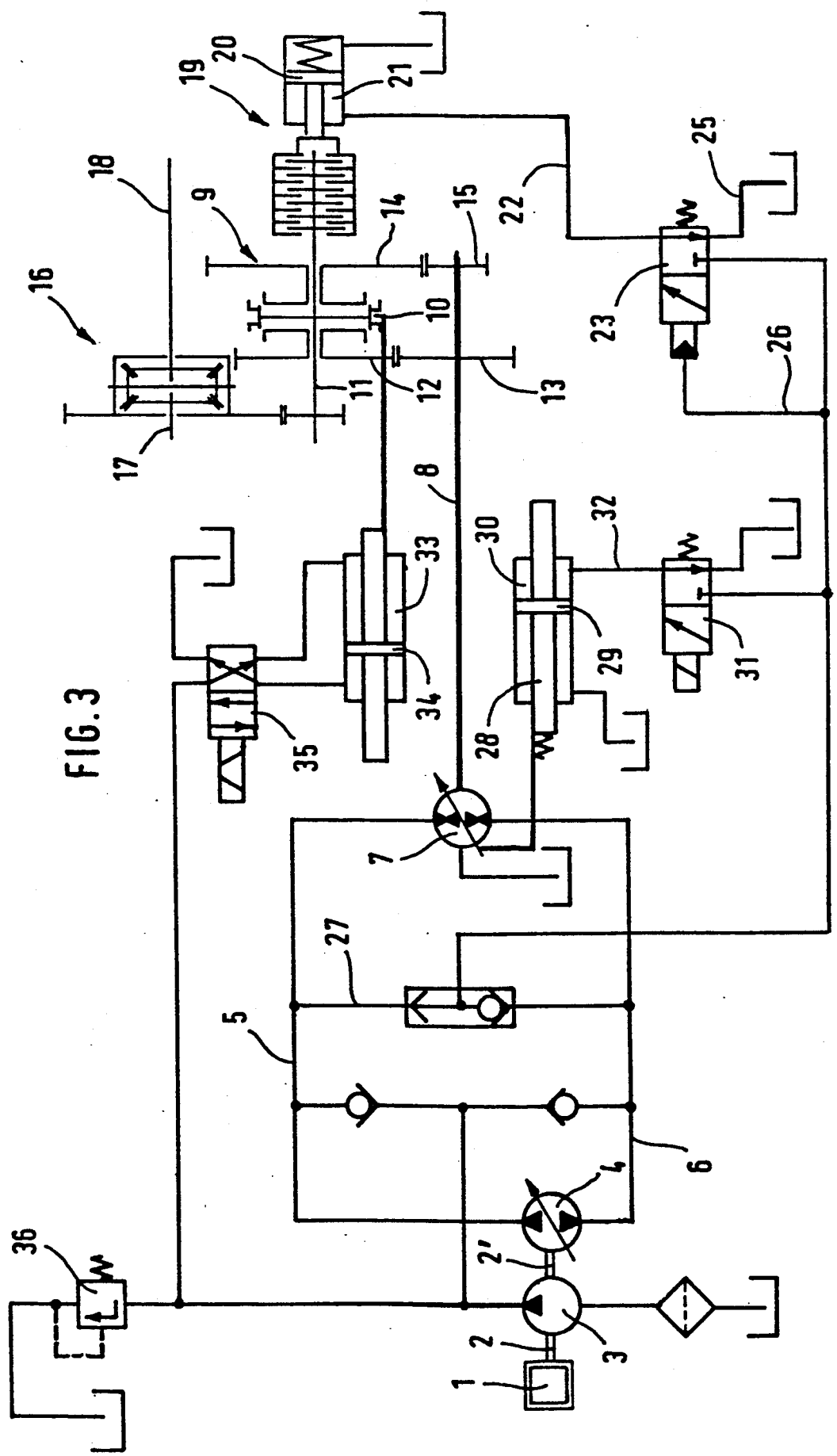

FIG. 3: The duct 24 can be dispensed with, by connecting the pressure connections of both 3/2-way valves 23, 31 with the pressure duct 26. Thereby, the pressure duct system is considerably simplified.

Description of Function

When the engine 1 is stopped, the servopressure system and the ducts 5, 6, 27 are pressure-free. It results that the pressure actuated 3/2-way valve 23 is in the position shown in FIG. 1, and the cylinder 21 is connected with the pressure-free pass 25. The disk brake 19 is pressed together by a spring and this way the vehicle is prevented from rolling away.

After the engine 1 has been started, the servopump 3 builds up the servopressure. As soon as the pump 4 has been adjusted for delivery, the operational pressure of the hydrostatic gearbox is present in the ducts 5 or 6, as well as in pressure ducts 27, 26. The operational pressure sets the 3/2-way valve so that the duct 24 is in connection with the duct 22 and the servopressure acts upon the piston 20, causing the piston 20 to move against the spring pressure and the parking brake 19 is vented.

Since the hydraulic pressure medium also drives the hydromotor 7, the vehicle can be set in motion corresponding to the gear ratio of the hydrostatic and the mechanical gearbox, to be selected by the driver.

We claim:

1. A hydrostatic-mechanical drive system particularly for agricultural and construction vehicles, said system comprising:

an adjustable hydrostatic gearbox including a servohydraulic pump, said gearbox employing for control a hydraulic pressure medium operating in a hydrostatic cycle, said cycle including a high-pressure segment;

a mechanical two step gearbox subsequently serially connected to said adjustable hydrostatic gearbox, comprising:

a driven shaft; and a mechanical parking brake acting directly upon said driven shaft, said brake including a cylinder;

a pressure duct leading away from said adjustable hydrostatic gearbox;

a 3/2-way valve communicating with said pressure duct and said cylinder;

a pressure-free return duct communicating with said 3/2-way valve and said pressure duct; and wherein said parking brake is actuated by a branching off of said pressure medium from said high-pressure segment of said hydrostatic cycle through said pressure duct to switch said 3/2-way valve either causing actuation of said cylinder of said parking brake with pressure from said servohydraulic pump or causing connection of said parking brake with said pressure-free return valve.

2. A hydrostatic-mechanical drive system according to claim 1, said adjustable hydrostatic gearbox further comprising an adjustable hydromotor, and said system further comprising controls for controlling said adjustable hydromotor and said mechanical two-step gearbox, said controls being actuated with said pressure medium in response to a signal, said signal being independent of any operational condition of said hydrostatic gearbox.

3. A hydrostatic-mechanical drive system according to claim 1, wherein said mechanical parking brake further comprises a prestressed spring, said brake being actuated by said prestressed spring in a closing direction and being vented due to said hydraulic pressure medium of said hydrostatic gearbox.

* * * * *